United States Patent
Pong

[19]
[11] Patent Number: 6,037,756
[45] Date of Patent: Mar. 14, 2000

[54] POWER SUPPLY WITH MIXED MODE BATTERIES

[76] Inventor: Ta-Ching Pong, 3 Fl., No. 36, Lane 21, Lungchiang Rd., Taipei, Taiwan

[21] Appl. No.: 09/264,170

[22] Filed: Mar. 5, 1999

[51] Int. Cl.[7] ............................. G05F 1/652; H01M 10/46
[52] U.S. Cl. ............................. 323/222; 320/118; 320/128
[58] Field of Search ............................. 323/222; 363/89; 320/118, 128, 138

[56] References Cited

U.S. PATENT DOCUMENTS

| | | | |
|---|---|---|---|
| 5,218,284 | 6/1993 | Burns et al. | 320/128 |
| 5,796,238 | 8/1998 | Hiratsuka et al. | 320/107 |
| 5,867,007 | 2/1999 | Kim | 320/118 |

*Primary Examiner*—Edward H. Tso
*Assistant Examiner*—Rajnikant B. Patel

*Attorney, Agent, or Firm*—Thomas, Kayden, Horstemeyer & Risley, L.L.P.

[57] ABSTRACT

A power supply having a high energy capacity battery module and a high energy power battery module for providing power to a load is disclosed. The high energy capacity battery module is connected to a DC to DC converter via a first switch for selectively providing power to the load. The high energy power battery module is connected to the DC to DC converter via a second switch for selectively providing power to the load. A charger is provided for connection to the high energy capacity battery module and the high energy power battery module via a third switch and a forth switch respectively for selectively enabling the high energy capacity battery module to charge the high energy power battery module. A controller is provided for performing switching operations on the first, second, third and fourth switches based on the operation conditions of the power supply.

13 Claims, 5 Drawing Sheets

POWER SUPPLY WITH MIXED MODE BATTERIES

BACKGROUND OF THE INVENTION

1. Field of the Invention

The present invention relates to a power supply, more particularly, to a power supply with mixed mode batteries, which includes different types of battery modules operating together to supply power to a load.

2. Description of Related Art

The use of electrical energy has made the life of human beings much easier. Various electrical apparatuses have become so useful in everyday life that they are considered necessities. Therefore, the assurance of a continuous supply of power has also become very important. Accordingly, the UPS (Uninterrupted Power Supply), which is a battery based source of power to a load when the utility power is abnormally low or unavailable entirely, or a typical portable electrical appliance/machine that is designed to be used with or without the utility electricity is provided. FIG. 7 shows a block diagram of a conventional UPS, including a battery module (71), an AC to DC converter (72), a charger (73), a sensor unit (74) and a DC to AC converter (75). When utility power is available, it is converted by the AC to DC converter (72) to constantly charge the battery module (71) via the charger (73). Once the sensor unit (74) detects that the utility power is below a preset normal threshold including being completely unavailable, the battery module (71) supplies power, which is optionally converted by the DC to AC converter (75), to a load. The duration that a UPS can supply power varies from a few minutes to hours, depending on the performance of the battery module. Obviously, it is desired to have a battery module that can supply power as long as possible. In addition, the battery module of the UPS should be able to endure sudden surges in demand for electrical energy. However, no single existing battery technologies can satisfy all the requirements of an ideal UPS. Some of the batteries can last for a long time but cannot accommodate the sudden surges in demand for electrical energy, while others that can meet the sudden surges in demand for electrical energy can only last for a short period of time. Therefore, there is a need to improve the power supplying capability of battery module.

SUMMARY OF THE INVENTION

The objective of the present invention is to provide a power supply with mixed battery technology, which has, at least, two different types of battery modules. The power supply is controlled such that all the advantages of the different battery modules can be used while the difficulties thereof can be avoided.

To achieve the objective, the power supply of the present invention comprises a DC to DC converter, a high energy capacity battery module, a high energy power battery module, a first charger and a controller. The DC to DC converter includes a transistor having a base driven by a square wave signal for providing a DC power to a load. The high energy capacity battery module is connected to the DC to DC converter via a first switch to selectively provide power to the load. The high energy power battery module is connected to the DC to DC converter via a second switch to selectively provide power to the load. The first charger has an input connected to the high energy capacity battery module via a third switch and an output connected to the high energy power battery module via a forth switch to selectively enable the high energy capacity battery module to charge the high energy power battery module. The controller is provided to perform switching operations on the first, second, third and fourth switches based on the operation conditions of the power supply and the load.

Other objectives, advantages, and novel features of the invention will become more apparent from the following detailed description when taken in conjunction with the accompanying drawings.

DETAILED DESCRIPTION OF PREFERRED EMBODIMENT

Figure 1:
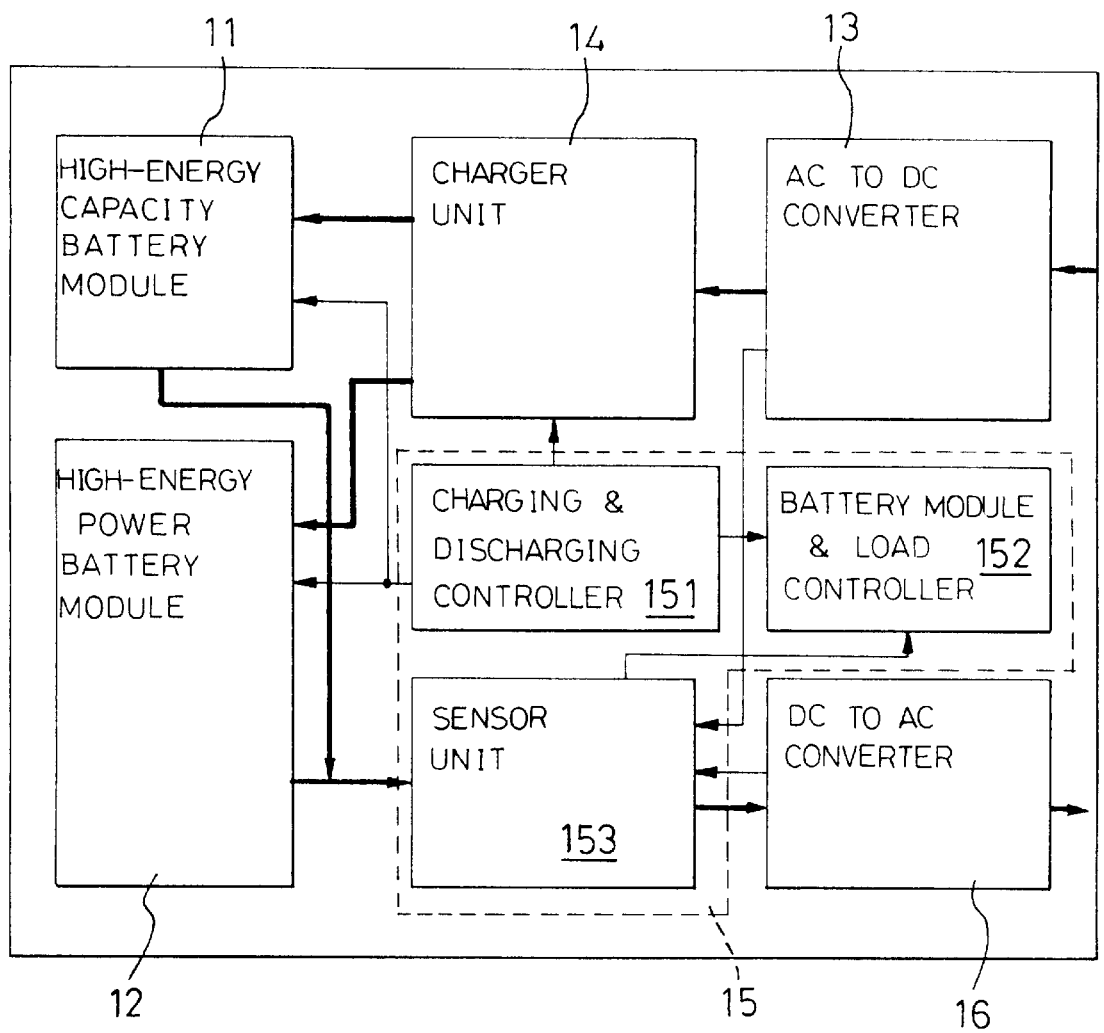
FIG. 1 is a block diagram of a preferred embodiment of the power supply with mixed mode batteries in accordance with the present invention.

FIG. 1 is a block diagram of a power supply with mixed mode batteries in accordance with the present invention. The power supply can be used as a UPS or a portable/movable power supply. The power supply comprises a high energy capacity battery module (11) (such as metal air battery module which includes at least one metal air battery), a high energy power battery module (12) (such as Pb-acid or NiCd battery module which includes at least one Pb-acid or NiCd battery), an AC to DC converter (13), a charger unit (14), a controller (15) and a DC to AC converter (16). The controller (15) further includes a charging and discharging controller (151), a battery module and load controller (152) and a sensor unit (153). The power supply in accordance with the present invention is different from the conventional UPS by having two different types of battery modules (11, 12) operated by the controller (15) such that all the advantages of the different battery modules (11, 12) can be used while the difficulties thereof can be avoided.

Figure 2:
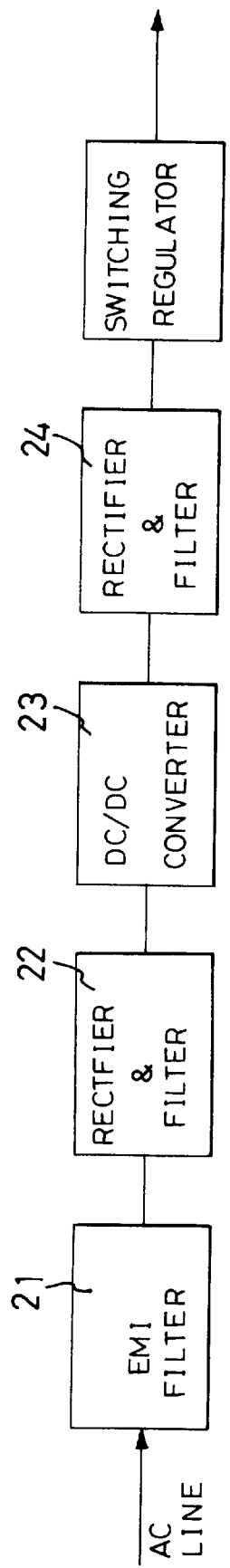
FIG. 2 is a block diagram of a converter used in a power supply.
Figure 3:
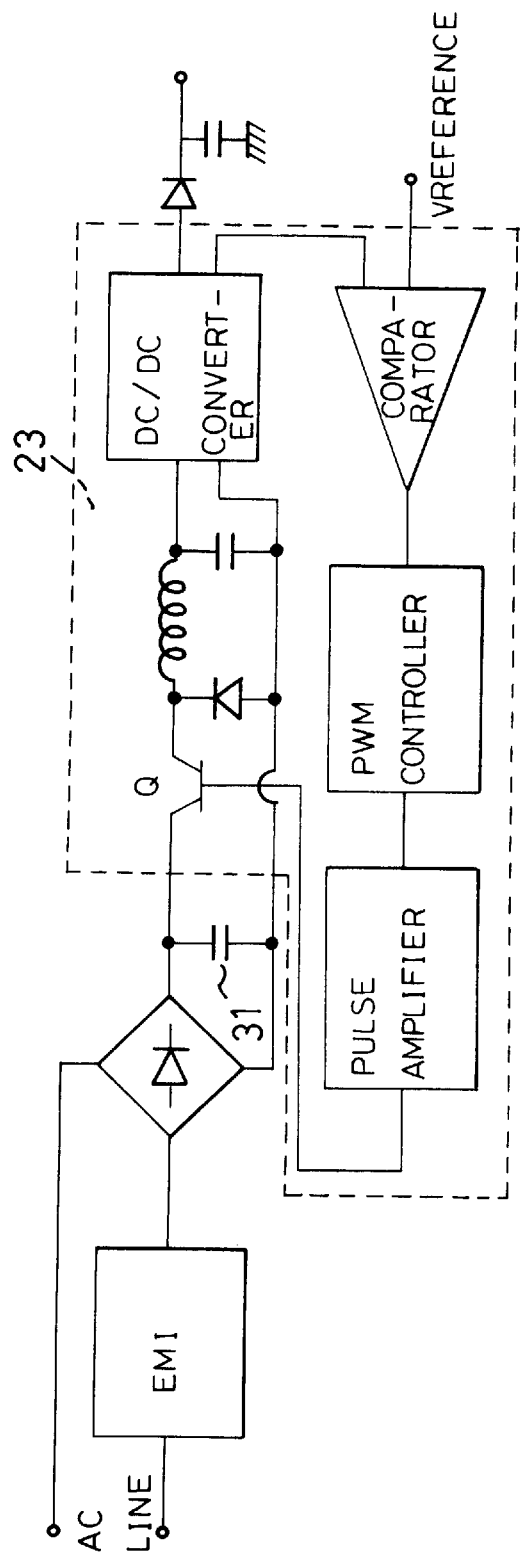
FIG. 3 is the circuit diagram of the converter shown in FIG. 2.
Figure 4:
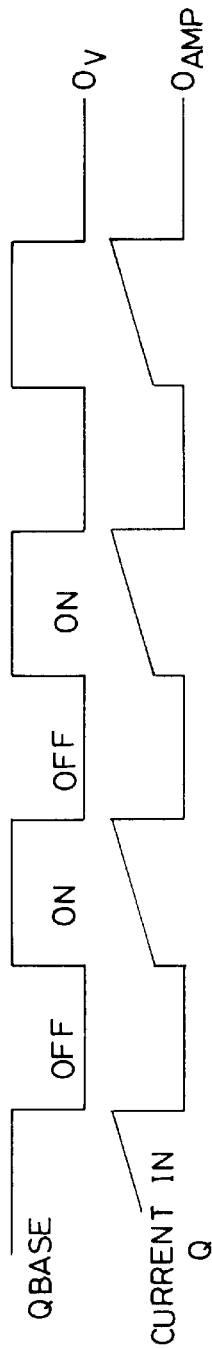
FIG. 4 shows the waveforms of the signal that is applied to the base of a transistor in the converter and the current in the transistor.
Figure 7:
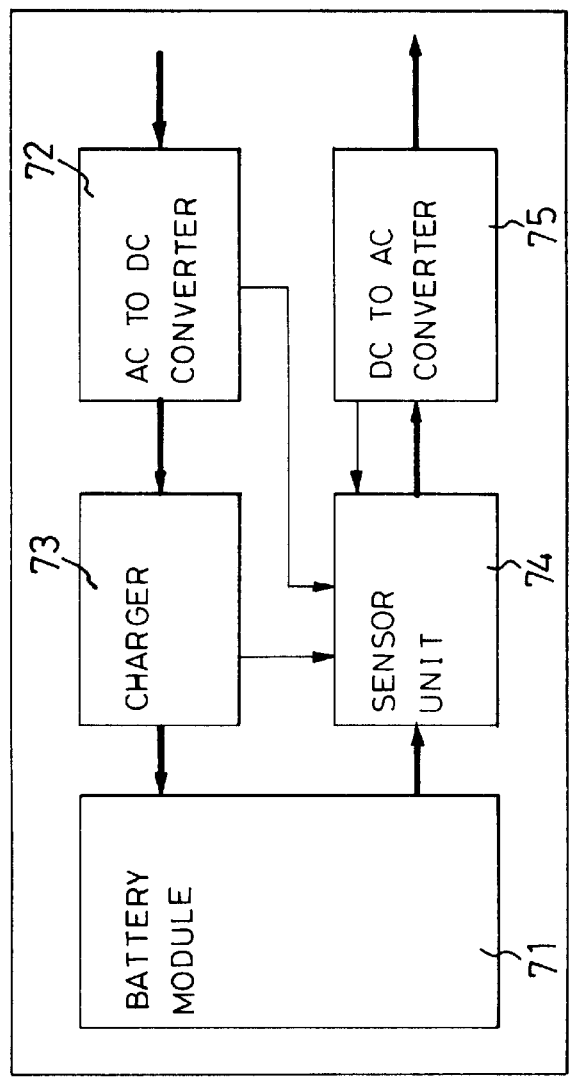
FIG. 7 is a block diagram of a conventional UPS.

The operation theory of the power supply with mixed mode batteries in accordance with the present invention is described by first referring to FIG. 2, which shows a known DC/AC converter used in a conventional power supply. The converter includes an EMI filter (21), a first rectifier and filter (22), a DC/DC converter (23), a second rectifier and filter (24) and a switching regulator (25) connected in series to convert the input AC power to supply power to a load. FIG. 3 is the circuit diagram of the converter shown in FIG. 2, wherein the DC/DC converter (23) includes a switch transistor Q having a base activated by the signal $Q_{base}$ from a PWM controller and a pulse amplifier thereby driving a DC/DC converting circuit to convert the voltage level of input power. FIG. 4 shows the waveforms of the signal $Q_{base}$ that are applied to the base of Q and the current in Q. The waveform of the signal $Q_{base}$ is a square wave, and when $Q_{base}$ is off, the capacitor (31) connected to the collector of Q is isolated from the load thereby being charged by the input power. Therefore, the off period of $Q_{base}$ can be fully utilized to charge the capacitor (31), which then may be discharged when $Q_{base}$ is on. The power supply with mixed mode batteries in accordance with the present invention also utilizes the off period of $Q_{base}$ to:

1. charge at least one battery of the high energy power battery module (12) with at least one battery of the high energy capacity battery module (11); and
2. charge the high energy capacity battery module (11) and/or the high energy power battery module (12) with the utility power that is not used by the load during the off period of $Q_{base}$.

Figure 5:
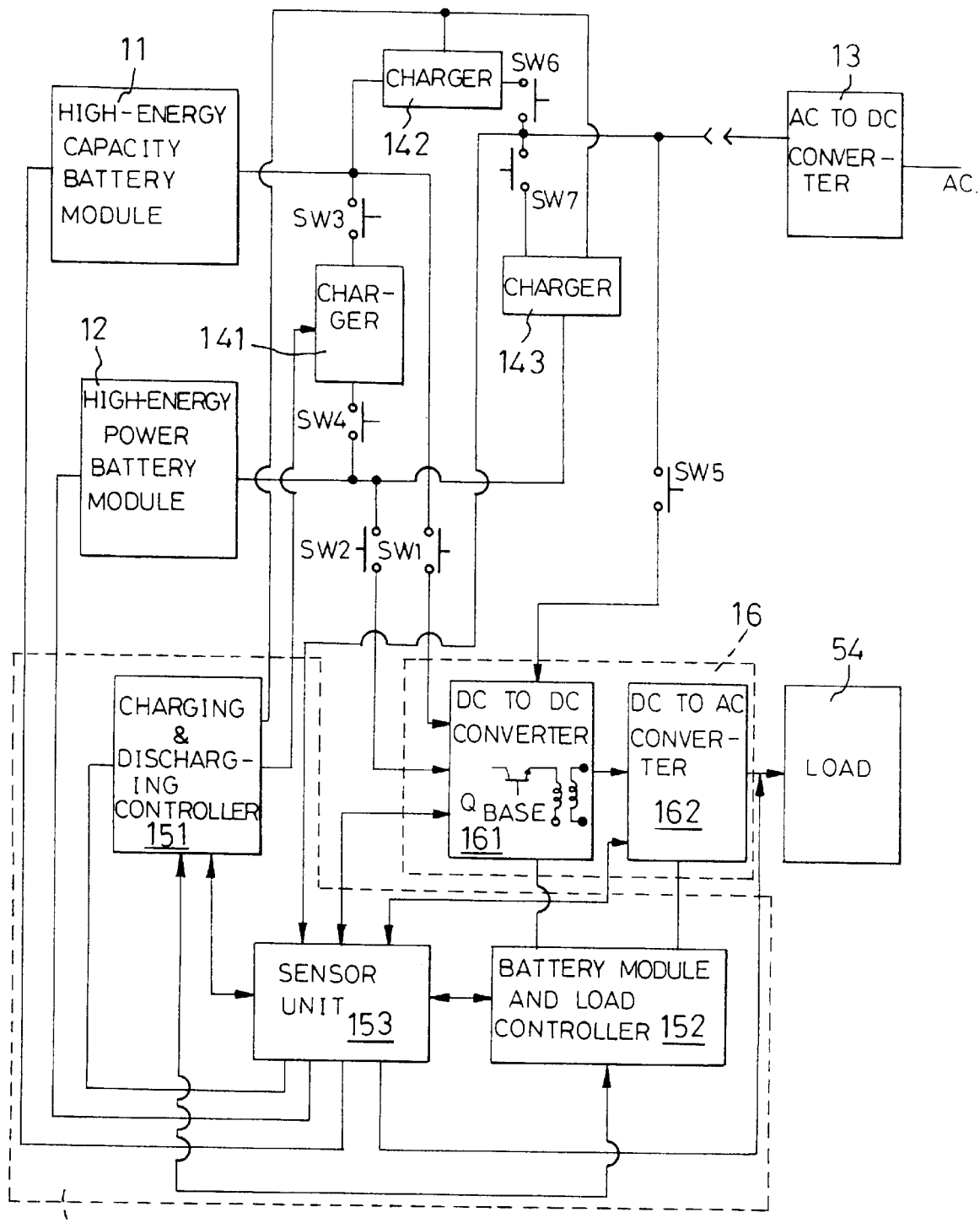
FIG. 5 is the circuit diagram of the preferred embodiment of the power supply shown in FIG. 1.

FIG. 5 shows that the control of the operation of the power supply is represented by using seven switches SW1, SW2, SW3, SW4, SW5, SW6 and SW7 driven by the controller (15). The high energy capacity battery module (11) and the high energy power battery module (12) are connected to the DC to AC converter (16), which includes a DC to DC converter (161) and an internal DC to AC converter (162), via the switches SW1 and SW2 respectively to supply power with the proper voltage level to the load (54). The internal DC to AC converter (162) is provided between the DC to DC converter (161) and the load (54) if AC power is required by the load (54). A first charger (141) of the charge unit (14) has an input connected to the high energy capacity battery module (11) via the switch SW3 and an output connected to the high energy power battery module (12) via the SW4 thereby the high energy capacity battery module (11) is able to charge the high energy power battery module (12). The AC to DC converter (13) is provided for converting the utility power to a DC power. The AC to DC converter (13) has an output connected to the DC to DC converter (161) via the switch SW5 for providing power to the load (54) when utility power is available. A second charger (142) of the charge unit (14) has an input connected to the output of the AC to DC converter (13) via the switch SW6 and an output connected to the high energy capacity battery module (11) whereby the high energy capacity battery module (11) can be charged by the utility power. A third charger (143) of the charge unit (14) has an input connected to the output of the AC to DC converter (13) via a switch SW7 and an output connected to the high energy capacity battery module (11) whereby the high energy power battery module (12) can be charged by the utility power.

The DC to DC converter (161) is driven, as described above, by a $Q_{base}$ signal to provide the voltage converting function. The controller (15), which can be implemented by an integrated circuit chip, is functionally divided into a charging and discharging controller (151), a sensor unit (153) and a battery module and load controller (152). The sensor unit (153) is provided to detect various operation conditions of the power supply, including the remaining energy capacity of the two battery modules (11, 12), the presence of utility power, the voltage level of $Q_{base}$ and the power consumption condition of the load (such as whether the load needs an instantaneously large power or not). The charging and discharging controller (151) is connected with the sensor unit (153) for receiving detected values about the operation conditions thereby controlling the three chargers (141, 142, 143) to properly charge or discharge the two battery modules (11, 12). The battery module and load controller (152) is connected with the charging and discharging controller (151) and the sensor unit (153) for performing switching operations on the switches SW1–SW7. More specifically, when the utility power is not available and Qbase is on, the switches SW3 and SW4 are both open while one of the switches SW1 and SW2 is closed and the other is open. Therefore, there is no charging activity between the two battery modules (11, 12). At this moment, which one of the switches SW1 and SW2 that is closed depends on the condition of the load (54) and the remaining energy capacity of the two battery modules (11, 12). That is, the sensor unit (153) receives the Qbase signal and detects the condition of the load (such as whether the load needs an instantaneously large power or not) and the remaining energy capacity of the two battery modules (11, 12) thereby determining which battery module is used to supply power to the load (54) by closing the corresponding switch. When $Q_{base}$ is off, the switches SW1 and SW2 are both open and SW3 and SW4 are both closed. Therefore, the high energy capacity battery module (11) is able to charge the high energy power battery module (12) via the first charger (141). When utility power is available, the sensor unit (153) detects the presence of the utility power and the switches SW6 and SW7 are closed or opened depending on the remaining energy capacity of the two battery modules (11, 12) thereby properly charging the high energy capacity battery module (11) and the high energy power battery module (12) via the second and third charger (142, 143), respectively. Further, the switches SW1, SW2, SW3 and SW4 are all open and the switch SW5 is closed so that the utility power is supplied to the load (54). The implementation of the switches SW1–SW7 can be achieved by using relays, SCRS, SSRs or other types of electronic switching means.

Figure 6:
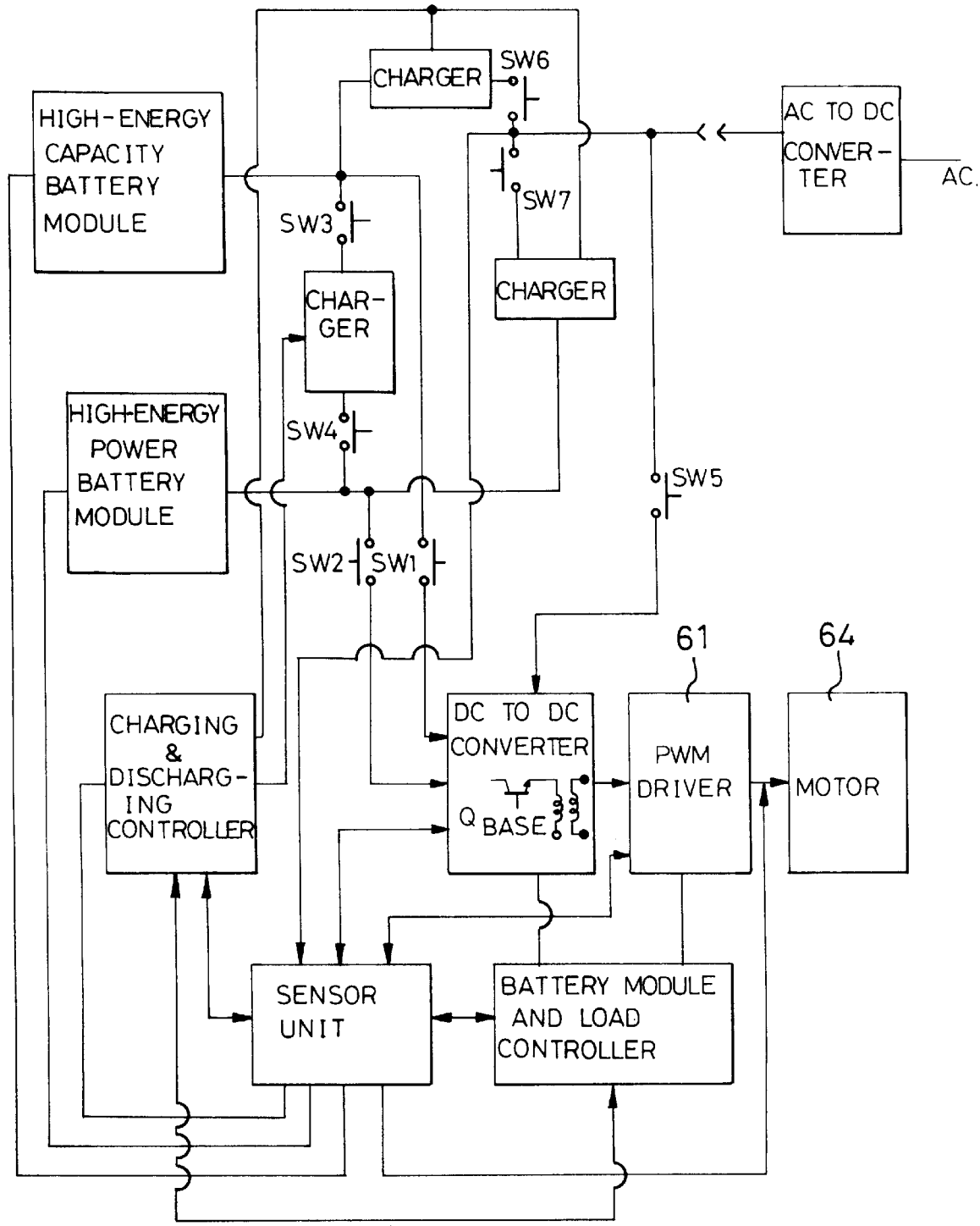
FIG. 6 is the circuit diagram of another preferred embodiment of the power supply in accordance with the present invention.

The power supply in accordance with the present invention can be configured as a UPS when the AC to DC converter (13) is implemented as a built-in component thereof. On the other hand, the power supply is configured as a portable power supply when the AC to DC converter (13) is implemented as an external component thereto. Furthermore, the present power supply can be modified to supply power while provide a speed control function to a DC/AC motor or other similar type of load by replacing the internal DC to AC converter (162) with a PWM driver (61), as shown in FIG. 6, or providing a PWM driver between the DC to AC converter (16) and the load (54) of FIG. 5. The operation of such a power supply to a DC/AC motor (64) is similar to that of the power supply shown in FIG. 5 except that the speed of the load, i.e. the DC/AC motor (64), is adjustable.

Although the present invention has been explained in relation to its preferred embodiment, it is to be understood that many other possible modifications and variations can be made without departing from the spirit and scope of the invention as hereinafter claimed.

What is claimed is:

1. A power supply with mixed mode batteries for supplying power to a load, said power supply comprising:

a DC to DC converter including a transistor having a base driven by a square wave signal for providing a DC voltage converting capability;

a high energy capacity battery module connected to said DC to DC converter via a first switch for selectively providing power to said load;

a high energy power battery module connected to said DC to DC converter via a second switch for selectively providing power to said load;

a first charger having an input connected to said high energy capacity battery module via a third switch and an output connected to said high energy power battery module via a forth switch for selectively enabling said high energy capacity battery module to charge said high energy power battery module; and a controller for performing switching operations on said first, second, third and fourth switches based on operation conditions of said square wave signal, said high energy capacity battery module, said high energy power battery module and said load, whereby said high energy power battery module can be charged during the off period of said square wave.

2. The power supply with mixed mode batteries as claimed in claim 1 further comprising:

an AC to DC converter having an output for providing a DC power converted from the utility power, said output being connected to said DC to DC converter via a fifth switch for providing power to said load when the utility power is available;

a second charger having an input connected to said output of said AC to DC converter via a sixth switch and an output connected to said high energy capacity battery module for selectively charging said high energy capacity battery module; and a third charger having an input connected to said output of said AC to DC converter via a seventh switch and an output connected to said high energy power battery module for selectively charging said high energy power battery module, whereby said high energy power battery module and said high energy capacity battery module can be charged during the off period of said square wave.

3. The power supply with mixed mode batteries as claimed in claim 2, wherein said controller comprising:

a sensor unit for detecting operation conditions of said square wave signal, said high energy capacity battery module, said high energy power battery module, said load and said utility power;

a charging and discharging controller connected to said sensor unit for receiving said operation conditions to control said first, second and third chargers;

a battery and load controller connected to said sensor unit and said charging and discharging controller for performing switching operations on said first, second, third, fourth, fifth, sixth and seventh switches.

4. The power supply with mixed mode batteries as claimed in claim 3, wherein said third and fourth switches are open, one of said first and second switches being closed and the other being open when said square wave signal is on and said utility power is not available, and wherein said first and second switches being open and said third and fourth switches being closed when said square wave signal is off and said utility power is not available.

5. The power supply with mixed mode batteries as claimed in claim 3, wherein said fifth switch is closed, said first and second switches being open, said third and fourth switches being open when said utility power is available.

6. The power supply with mixed mode batteries as claimed in claim 5, wherein said AC to DC converter is a built-in component of said power supply.

7. The power supply with mixed mode batteries as claimed in claim 5, wherein said AC to DC converter is an external component to said power supply.

8. The power supply with mixed mode batteries as claimed in claim 5 further comprising an internal DC to AC converter provided between said DC to DC converter and said load for providing an AC power to said load.

9. The power supply with mixed mode batteries as claimed in claim 5, wherein said load is a DC motor, said power supply further comprising a PWM driver provided between said DC to DC converter and said DC motor for supplying power and providing a speed control function to said DC motor.

10. The power supply with mixed mode batteries as claimed in claim 5, wherein said high energy capacity battery module comprising at least one metal air battery.

11. The power supply with mixed mode batteries as claimed in claim 5, wherein said high energy power battery module comprising at least one Pb-acid battery.

12. The power supply with mixed mode batteries as claimed in claim 5, wherein said high energy power battery module comprising at least one NiCd battery.

13. The power supply with mixed mode batteries as claimed in claim 8, wherein said load is a AC motor, said power supply further comprising a PWM driver provided between said DC to AC converter and said AC motor for supplying power and providing a speed control function to said AC motor.

* * * * *